United States Patent
Bransi et al.

(10) Patent No.: US 12,192,171 B2
(45) Date of Patent: Jan. 7, 2025

(54) SUPPORTING ZONE-BASED POLICY ENFORCEMENT FOR A FIREWALL CONNECTED TO A ONE-ARM LOAD BALANCER

(71) Applicant: Palo Alto Networks, Inc., Santa Clara, CA (US)

(72) Inventors: Charles Bransi, Palo Alto, CA (US); Steven Alsop, Meriden (GB)

(73) Assignee: Palo Alto Networks, Inc., Santa Clara, CA (US)

( * ) Notice: Subject to any disclaimer, the term of this patent is extended or adjusted under 35 U.S.C. 154(b) by 703 days.

(21) Appl. No.: 17/447,821

(22) Filed: Sep. 16, 2021

(65) Prior Publication Data
US 2023/0084011 A1 Mar. 16, 2023

(51) Int. Cl.
*H04L 29/06* (2006.01)
*H04L 9/40* (2022.01)
*H04L 45/74* (2022.01)

(52) U.S. Cl.
CPC .......... *H04L 63/0236* (2013.01); *H04L 45/74* (2013.01); *H04L 63/205* (2013.01); *H04L 2212/00* (2013.01)

(58) Field of Classification Search
None
See application file for complete search history.

(56) References Cited

U.S. PATENT DOCUMENTS

| | | |
|---|---|---|
| 7,721,084 B2 | 5/2010 | Salminen et al. |
| 10,218,675 B2 | 2/2019 | Mohan et al. |
| 11,870,753 B2 * | 1/2024 | Saavedra ............ H04L 63/0236 |
| 11,929,987 B1 * | 3/2024 | D N ........................ H04L 49/25 |
| 11,949,654 B2 * | 4/2024 | McDowall .......... H04L 63/0227 |
| 11,979,746 B1 * | 5/2024 | Verma ................... H04L 63/168 |
| 2005/0114648 A1 * | 5/2005 | Akundi ............... H04L 63/0236 713/153 |

(Continued)

OTHER PUBLICATIONS

Palo Alto Networks, Inc., "VM-Series Integration with an AWS Gateway Load Balancer", Palo Alto TechDocs, retrieved on Jun. 4, 2021 from https://docs.paloaltonetworks.com/vm-series/10-0/vm-series-deployment/set-up-the-vm-series-firewall-on-aws/vm-series-integration-with-gateway-load-balancer.html, May 2021, 3 pages.

*Primary Examiner* — Jeffery L Williams
(74) *Attorney, Agent, or Firm* — Gilliam IP PLLC

(57) ABSTRACT

A virtual firewall configured with two interfaces assigned different security zones switches between Layer 3 routing and bump-in-the-wire (BITW) modes between sessions. After receiving a packet from a one-arm load balancer, an inner header is determined based on decapsulation which removes an outer header. A route lookup is performed based on the inner header to determine whether to communicate packets of the session with Layer 3 routing or according to the BITW model. The result of the route lookup indicates an egress interface. If the ingress and egress interfaces are the same, the firewall operates according to the BITW model for the session. If the egress and ingress interfaces are different, the firewall routes packets of the session with Layer 3 routing. Upon detection of subsequent packets, the firewall operates according to the determined mode for the session without performing additional inner header route lookups for operation mode determination.

20 Claims, 6 Drawing Sheets

(56) References Cited

U.S. PATENT DOCUMENTS

| | | | |
|---|---|---|---|
| 2006/0095579 A1* | 5/2006 | Arregoces | H04L 67/1001 |
| | | | 709/229 |
| 2006/0095960 A1* | 5/2006 | Arregoces | H04L 67/1001 |
| | | | 726/11 |
| 2015/0089053 A1* | 3/2015 | Harper | G06F 9/45512 |
| | | | 709/224 |
| 2017/0099182 A1* | 4/2017 | DeBolle | H04L 41/0893 |
| 2017/0099187 A1* | 4/2017 | Dale | H04L 41/0816 |
| 2018/0069770 A1* | 3/2018 | Mihelich | H04L 63/0421 |
| 2018/0159898 A1* | 6/2018 | Gibson | H04L 63/0263 |
| 2019/0288980 A1* | 9/2019 | Pan | H04L 61/5038 |
| 2020/0177550 A1* | 6/2020 | Valluri | H04L 41/0806 |
| 2020/0322219 A1* | 10/2020 | DeBolle | H04L 41/0894 |
| 2021/0352048 A1* | 11/2021 | Guise, Jr. | H04L 12/4675 |
| 2022/0303246 A1* | 9/2022 | Miriyala | G06F 21/53 |
| 2022/0353240 A1* | 11/2022 | McDowall | H04L 63/0227 |
| 2023/0084011 A1* | 3/2023 | Bransi | H04L 63/0236 |
| | | | 726/1 |
| 2023/0128082 A1* | 4/2023 | Guise, Jr. | H04L 63/20 |
| | | | 726/12 |
| 2024/0073011 A1* | 2/2024 | Kunz | H04L 63/0236 |
| 2024/0267293 A1* | 8/2024 | Fainberg | H04L 41/0895 |
| 2024/0275803 A1* | 8/2024 | Varanasi | H04L 63/1425 |

* cited by examiner

SUPPORTING ZONE-BASED POLICY ENFORCEMENT FOR A FIREWALL CONNECTED TO A ONE-ARM LOAD BALANCER

BACKGROUND

The disclosure generally relates to transmission of digital information and to network architectures or network communication protocols for network security.

Load balancers generally are deployed as one-arm load balancers or two-arm load balancers. In the context of firewalls or other security appliances, load balancers can be utilized for load balancing network traffic across firewalls for inspection of network traffic on ingress. One-arm load balancer deployments can be utilized for firewalls configured with a single interface, where the firewalls return network traffic to the one-arm load balancer after inspection. This can be distinguished from two-arm load balancer deployments, in which the load balancer can be deployed with firewalls configured with two interfaces such that network traffic ingresses on one interface and egresses on another interface without returning the network traffic to the load balancer after inspection. Firewall as a service (FWaaS) solutions in which firewalls or other security appliances are delivered as cloud-based services support establishment and configuration of "fleets" of firewalls or other security appliances. Such FWaaS solutions often utilize one-arm load balancer deployments for load balancing network traffic across the fleet of firewalls for inspection of network traffic on ingress.

Some firewalls support zone-based security policies. A zone is associated with an interface(s) to which security policies can be attached (e.g., installed or otherwise made accessible). Different sets of security policies can thus be applied to traffic flow between different zones based on direction of the traffic flow. As an example, a firewall may have interfaces corresponding to trusted zones and untrusted zones, which may be defined as a private network and networks external to the private network, respectively. Security policies can thus be defined and attached to the interfaces which distinguish between traffic flowing from the untrusted zone to the trusted zone and traffic flowing from the trusted zone to the untrusted zone, which provides for increased flexibility in security policy enforcement.

BRIEF DESCRIPTION OF THE DRAWINGS

Embodiments of the disclosure may be better understood by referencing the accompanying drawings.

DESCRIPTION

Figure 1:
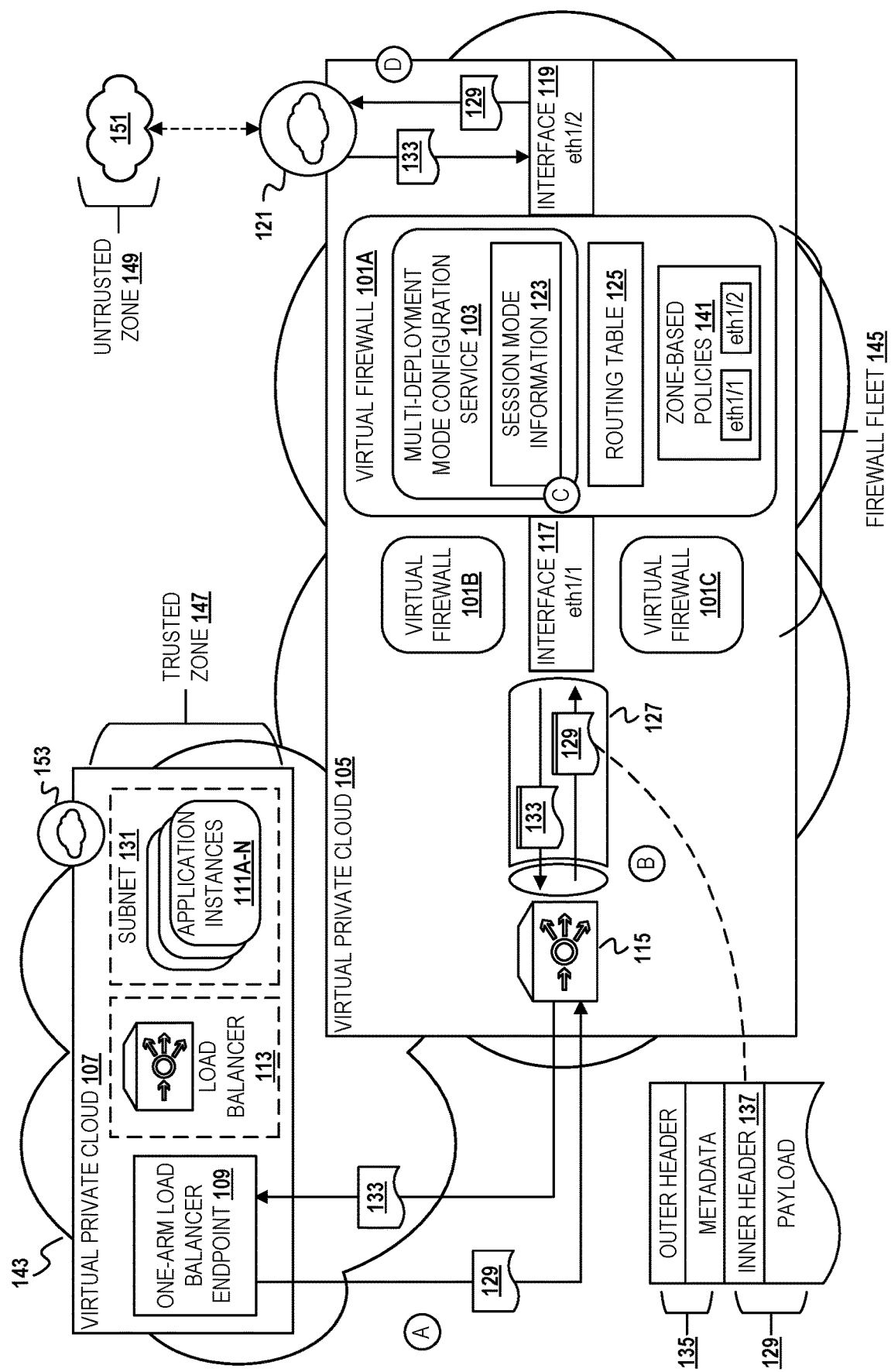
FIG. 1 depicts a conceptual diagram of facilitating zone-based policy enforcement for firewalls deployed behind a one-arm load balancer by supporting bump-in-the-wire and Layer 3 routing firewall configuration modes.

The description that follows includes example systems, methods, techniques, and program flows that embody aspects of the disclosure. However, it is understood that this disclosure may be practiced without these specific details. For instance, this disclosure refers to distributing network traffic across a fleet of virtual firewalls for inspection in illustrative examples. Aspects of this disclosure can be also applied to utilization of a fleet of other virtual security appliances for inspection of network traffic. In other instances, well-known instruction instances, protocols, structures and techniques have not been shown in detail in order not to obfuscate the description.

Overview

Many customers transitioning to FWaaS solutions which utilize a one-arm load balancer deployment (hereinafter "one-arm load balancer" or simply "load balancer") for load balancing across a firewall fleet experience several drawbacks. First, virtual firewalls behind the load balancer cannot be configured with multizone policies due to the single interface used by the load balancer. Multizone security policies attached to interfaces of legacy firewall deployments thus are rendered incompatible with the firewall fleet solution, and new security policies are limited to single-zone policies. Further, the NAT is performed before the load balancer passes network traffic to a virtual firewall, which results in a loss of visibility of the source IP address associated with the network traffic upon receipt by the firewall. In particular, because the load balancer translates source IP addresses to reflect the IP address of the load balancer before passing load balanced traffic to virtual firewall instances, each host has the same IP address from the perspective of the firewall. The ability to enforce security policies based on IP addresses thus is also lost, reducing the flexibility of security policy enforcement across firewall deployments.

To resolve these issues, a virtual firewall which inspects traffic passed from a load balancer in a one-arm load balancer deployment can switch between Layer 3 routing and bump-in-the-wire modes of deployment between sessions based on performing a first route lookup as described herein. In the bump-in-the-wire model, which is conventionally the supported model for one-arm load balancer deployments, traffic passed to the firewall from the load balancer is inspected and returned to the load balancer. However, as described herein, outbound traffic inspected by the firewall and allowed to pass can be sent directly to an Internet gateway for routing to its destination according to Layer 3 protocol, which provides for Layer 3 routing in addition to bump-in-the-wire modes of firewall deployment and ultimately supports enforcement of multizone policies for outbound network traffic.

The firewall is configured with two interfaces rather than one interface, where each interface is assigned a different zone (e.g., designated trusted and untrusted zones). Based on receiving a packet from the load balancer during initiation of a session, the firewall determines the inner header exposed as a result of decapsulation of the packet which removes the outer header with which the packet was encapsulated. The firewall performs a route lookup with the destination address included in the inner header to determine whether packets of the session should be routed with Layer 3 routing or communicated according to the bump-in-the-wire model. The result of the route lookup using the address of the inner header indicates an egress interface for the packet. If the egress interface is the same as the ingress interface, or the interface on which the packet entered the firewall, the firewall can determine that the packet is traveling within the same zone and the firewall should operate according to the bump-in-the-wire model for the remainder of the session. Packets communicated while the firewall acts according to bump-in-the-wire are re-encapsulated with the outer header which was removed for the inner header-based route lookup. Otherwise, if the egress interface is different than the ingress interface, the firewall can determine that the packet is traveling between different zones and the firewall should route packets communicated during the remainder of the session with Layer 3 routing, where the outbound packet is forwarded to an Internet gateway without re-encapsulation. The packet information and corresponding firewall deployment mode is then stored in association with session information so that the firewall can operate according to the determined mode upon detection of subsequent packets of the session without again determining the deployment mode through additional route lookups. NAT of outbound traffic is also performed by the firewall rather than the load balancer to retain visibility of source IP addresses that would otherwise be lost as a result of NAT performed before load balanced packets are passed to the firewall. As a result, both east/west and north/south traffic can be handled by the firewall and inspected based on policies defined for the appropriate pairings of source and destination zones while also allowing for visibility into source IP addresses.

Example Illustrations

FIG. 1 depicts a conceptual diagram of facilitating zone-based policy enforcement for firewalls deployed behind a one-arm load balancer by supporting bump-in-the-wire and Layer 3 routing firewall configuration modes. FIG. 1 depicts a virtual private cloud (VPC) 105 and a VPC 107. The VPCs 105, 107 provide private cloud environments within a public cloud 143 offered by a cloud service provider (CSP). An Internet gateway 121 is attached to (i.e., was created in association with) the VPC 105. An Internet gateway 153 is attached to the VPC 107. The Internet gateways 121, 153 provide for communication of packets between instances running on the VPCs 105, 107 and the Internet 151.

The VPC 107 has been configured with a subnet 131 on which application instances 111A-N run. A load balancer 113 load balances network traffic across the application instances 111A-N. The load balancer 113 may be a two-arm load balancer such that the load balancer 113 is located inline with respect to the flow of network traffic to and from the subnet 131. A fleet 145 of stateful firewalls, which includes virtual firewalls ("firewalls") 101A-C, and a one-arm load balancer ("load balancer") 115 have been deployed to the VPC 105. The load balancer 115 is deployed as a one-arm load balancer and load balances traffic across the fleet 145 of virtual firewalls. The VPC 107 has been configured with a one-arm load balancer endpoint ("load balancer endpoint") 109 which is an endpoint for the load balancer 115 (e.g., an endpoint service). The load balancer endpoint 109 facilitates communication of both north/south and east/west network traffic between the subnet 131 and the load balancer 115 for distribution to the firewalls 101A-C for inspection.

The firewall 101A is depicted in additional detail in FIG. 1 for clarity, although the firewalls 101B-C can operate and be configured similarly to the firewall 101A. The firewall 101A has been configured with two interfaces: an interface 117 and an interface 119, named eth1/1 and eth1/2, respectively. The interfaces 117, 119 are interfaces (e.g., cloud-based firewall interfaces defined on Ethernet interfaces) which have been configured to provide for operation of the firewall 101A according to both bump-in-the-wire and Layer 3 routing modes of deployment. The interface 117 has been configured for bump-in-the-wire deployment of the firewall 101A which also can allow Layer 3 packets (e.g., IP packets) to pass. The interface 119 has been configured as a Layer 3 interface.

Bump-in-the-wire configuration of a firewall, also referred to herein as the bump-in-the-wire deployment, refers to configurations of a firewall connected to a one-arm load balancer in which the firewall returns packets to the one-arm load balancer after inspection of the packets without any switching or routing of the packets. The one-arm load balancer is thus the source and destination of packets sent to the firewall for inspection in a bump-in-the-wire mode of deployment. For instance, referring to FIG. 1, when the firewall 101A is configured for a bump-in-the-wire deployment, packets received from the load balancer 115 on the interface 117 are inspected and, if allowed to pass, are returned to the load balancer 115 for communication to their destination (e.g., for east/west network traffic sent between VPCs). The Layer 3 routing configuration refers to configurations of the firewall in which the firewall routes packets communicated between networks according to Layer 3 protocol (e.g., routing of IP packets) and performs NAT on packets. For instance, referring to FIG. 1, when the firewall 101A is configured for Layer 3 routing, the firewall 101A can send packets received on the interface 117 out on the interface 119 following NAT for routing to an external network.

The interfaces 117, 119 also have been assigned to different zones. The interface 117 is assigned to a trusted zone 147, which corresponds to the VPC 105. The trusted zone 147 may encompass other VPCs which are not depicted in FIG. 1. The interface 119 is assigned to an untrusted zone 149, which corresponds to other networks (e.g., public networks) and resources that are accessible over the Internet 151. While the zones to which the interfaces 117, 119 are assigned are named the "trusted" and "untrusted" zones in this example, in other embodiments, the names of the zones to which the interfaces 117, 119 are assigned may be different so long as the zones themselves are different (e.g., an internal zone and an external zone). Zone-based policies ("policies") 141 are attached to the firewall 101A and specify sets of security policies to enforce for network traffic based on determined source and destination zones of the network traffic. The policies 141 include policies defined for the interface 117, or security policies for network traffic sent within the trusted zone 147 (e.g., east/west traffic). The policies 141 also include policies defined for the interface 119, or security policies for network traffic sent between the trusted zone 147 and untrusted zone 149 (e.g., north/south traffic). Network traffic entering the firewall 101A from a source within the trusted zone 147 and/or exiting the firewall 101A for communication to a destination within the trusted zone 147 does so via the interface 117. For example, east/west traffic having source and destination IP addresses within the subnet 131 enters and exits the firewall 101A for inspection via the interface 117. Similarly, network traffic entering the firewall 101A from a source within the untrusted zone 149 and/or exiting the firewall 101A for communication to a destination in the untrusted zone 149 does so via the interface 119. The policies 141 used for firewall inspection of network traffic are applied accordingly depending on the ingress and egress interfaces, which correspond to source and destination zones.

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations. Additionally, FIG. 1 depicts an example of stages of operations for handling outbound traffic. The outbound traffic scenario is provided as an example, and inbound and east/west traffic is also supported.

At stage A, a packet 129 having a source IP address corresponding to the subnet 131 is sent to the VPC 105 for firewall inspection. The packet 129 is routed to the load balancer endpoint 109, which forwards the packet 129 to the load balancer 115. The packet 129 is a packet which comports to Layer 3 (i.e., network layer) protocols and includes a header 137 and a payload. For instance, the packet 129 may be an IPv4 packet which comprises an IPv4 header and a payload. The source zone of the packet 129 is the trusted zone 147.

At stage B, the load balancer 115 sends the encapsulated packet 129 to the firewall 101A over a tunnel 127. Sending of the packet 129 to the firewall 101A resulted from the load balancing algorithm implemented by the load balancer 115. Network traffic sent between the load balancer 115 and the firewalls 101A-C is encapsulated for communication over tunnels, and the load balancer 115 and each of the firewalls 101A-C comprise tunnel endpoints. With respect to the firewall 101A, the tunnel endpoint can be a virtual interface which is mapped to the interface 117. With respect to the load balancer 115 and the firewall 101A, network traffic sent between these entities is encapsulated for communication over the tunnel 127. The tunnel endpoint corresponding to the load balancer 115 encapsulates the packet 129 with a header 135. The packet 129 encapsulated with the header 135 may be a Generic Network Virtualization Encapsulation (GENEVE) packet encapsulated with a GENEVE header. The header 135 comprises an outer header and metadata. To distinguish the header 135 from the header 137 with respect to the format of the packet 129, the headers are referred to hereinafter as the outer header 135 and the inner header 137. The firewall 101A receives the packet 129 over the tunnel 127 on the interface 117 (i.e., on the tunnel endpoint which maps to the interface 117). On arrival at the tunnel endpoint which maps to the interface 117, the tunnel endpoint decapsulates the packet 129, which removes the outer header 135 and exposes the inner header 137.

At stage C, a multi-deployment mode configuration service ("service") 103 determines a deployment mode for communication of packets of the current session. Determining the deployment mode refers to determining whether the firewall 101A will act according to the bump-in-the-wire configuration or the Layer 3 routing configuration for communicating packets of the session. The firewall 101A will communicate packets of the session according to the bump-in-the wire configuration if detected packets are to enter and exit the firewall 101A on the same interface, including east/west traffic traveling within the trusted zone 147 and entering/exiting the firewall 101A on the interface 117. The firewall 101A will route packets of the session with Layer 3 routing if detected packets are to enter and exit the firewall 101A on different interfaces, including north/south traffic traveling from the trusted zone 147 to the untrusted zone 149 and entering the firewall 101A on the interface 117 and exiting on the interface 119, or vice-versa.

The service 103 determines the deployment mode for the session based on the decapsulation of the packet 129 by performing a route lookup using the inner header 137 of the packet 129 in a routing table 125. Decapsulation of the packet 129 after communication over the tunnel 127 removed the outer header 135 with which the packet 129 was encapsulated, which makes the destination IP address of the inner header 137 accessible. The service 103 performs a route lookup in the routing table 125 with the destination IP address of the inner header 137 instead of the IP address of the outer header 135 as a result of the decapsulation. The result of the route lookup with the destination IP address of the inner header 137 indicates the egress interface of the firewall 101A for the packet 129. In this example, the service 103 determines based on the result of the route that the packet 129 is traveling to a destination within the untrusted zone 149 and thus should exit the firewall 101A on the interface 119.

Because the packet 129 is traveling between different zones and is exiting the firewall 101A on a different interface than it entered, the service 103 also determines that the packet 129 and subsequent packets of the current session should be routed with Layer 3 routing. The service 103 updates session mode information 123 to indicate that the current session designated by the session ID should continue according to Layer 3 routing by the firewall 101A. The session mode information 123 comprises indications of sessions processed by the firewall 101A (e.g., session identifiers) and, for each session, an identifier, label, etc. which indicates the firewall deployment mode with which the session is being supported. The session mode information 123 may be labels, identifiers, etc. associated with a state table of the firewall 101A may be an additional state table maintained for the firewall 101A. The firewall 101A can then perform NAT of the packet 129. Upon receipt of subsequent packets during the session, rather than performing additional inner header lookups, the service 103 will search the session mode information 123 for the session ID and, upon determining that the session is denoted as associated with Layer 3 routing, performs NAT on received packets and routes the packets with Layer 3 routing.

At stage D, the firewall 101A sends the packet 129 out over the interface 119 to the Internet gateway 121 to be routed to its destination within the untrusted zone 149 and receives return traffic 133. The firewall 101A sends the packet out on the interface 119 determined as a result of the route lookup performed with the destination IP address of the inner header 137 assuming that the packet 129 is allowed by the multizone policies of the policies 141 for traffic traveling from the trusted zone 147 to the untrusted zone 149. Packets such as the packet 129 which are routed to their destination via the Internet gateway 121 remain decapsulated as a result of removal of the outer header 135 until re-encapsulation of the return traffic which is sent to the load balancer 115 over the tunnel 127. Upon receipt of return traffic 133 originating within the untrusted zone 149, the return traffic 133 enters the firewall 101A on the interface 119 for inspection based on the policies 141. The service 103 searches the session mode information 123 for the session ID associated with the return traffic 133 and determines that the firewall 101A is supporting the session with Layer 3 routing as determined during session setup at the firewall 101A. The service 103 performs NAT of the return traffic 133 for inspection based on those of the policies 141 which are multizone policies designating the interface 119. If the return traffic 133 is allowed by policy, the service 103 sends the return traffic 133 out on the interface 117, where the tunnel endpoint which maps to the interface 117 encapsulates the return traffic 133 with a tunnel header for communication over the tunnel 127 (e.g., a GENEVE header). Following decapsulation of the return traffic 133 upon arrival at the tunnel endpoint corresponding to the load balancer 115, the load balancer 115 sends the return traffic 133 back to the VPC 107 via the load balancer endpoint 109 to be directed to its destination within the subnet 131.

Figure 2:
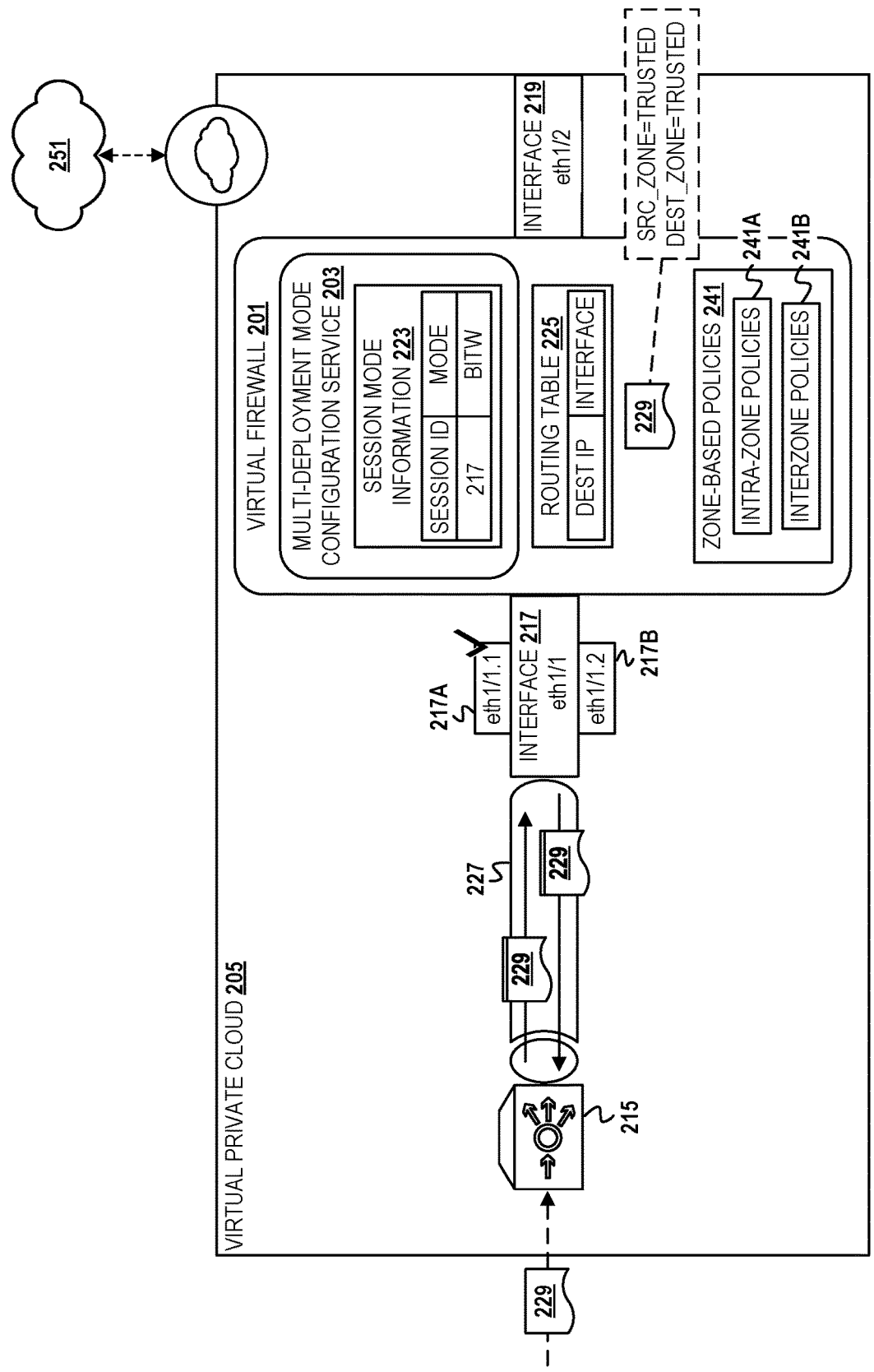
FIG. 2 depicts a conceptual diagram of determining whether a firewall should handle packets of an existing session according to bump-in-the-wire or Layer 3 routing modes of deployment.

FIG. 2 depicts a conceptual diagram of determining whether a firewall should handle packets of an existing session according to bump-in-the-wire or Layer 3 routing modes of deployment. As similarly described in reference to FIG. 1, a virtual firewall ("firewall") 201 is deployed to a VPC 205. The firewall 201 is connected to a one-arm load balancer ("load balancer") 215. While FIG. 2 depicts a single virtual firewall running on the VPC 205 for simplicity, a firewall fleet comprising two or more virtual firewalls across which the load balancer 215 load balances traffic may be deployed to the VPC 205. The firewall 201 has an interface 217, named eth1/1, which may be configured as a bump-in-the-wire interface and is assigned to a first zone, such as a trusted zone). The interface 217 includes two sub-interfaces which are both assigned to the first zone: a sub-interface 217A and a sub-interface 217B, named eth1/1.1 and eth1/1.2, respectively. The sub-interfaces 217A-B are logical interfaces defined on the interface 217. The firewall 201 also includes an interface 219 named eth1/2 and may be assigned to another zone which is different from the first zone, such as an untrusted zone which encompasses networks/systems accessible over the Internet 251. The interface 219 may be configured as a Layer 3 interface.

The sub-interfaces 217A-B allow for logical segregation of network traffic based on source and destination zones. In other words, the sub-interface 217A can be configured for east/west traffic sent from the load balancer 215 that is traveling within the same zone (e.g., within the trusted zone), while the sub-interface 217B can be configured for outbound network traffic sent from the load balancer 215 that is traveling between different zones (e.g., from the trusted zone to an untrusted zone). The load balancer 215 sends load balanced packets to the interface 217 on which the sub-interfaces 217A-B are defined, via the IP address associated with the interface 217. The firewall 201 uses metadata in encapsulation headers of received packets (e.g., GENEVE headers) to classify the packets as corresponding to the sub-interface 217A or the sub-interface 217B. Having network traffic travelling within the same zone be classified as corresponding to one sub-interface and network traffic travelling between zones be classified as corresponding to the other sub-interface allows for determining those of zone-based security policies 241 which should be applied to the network traffic based on the logical ingress interface; that is, "intra-zone" (i.e., within the zone) security policies 241A should be applied to network traffic corresponding to the sub-interface 217A, while interzone security policies 241B should be applied to network traffic corresponding to the sub-interface 217B.

As similarly described in reference to FIG. 1, the load balancer 215 obtains a packet 229 originating from a source within the trusted zone. The load balancer 215 sends the packet 229 out on a tunnel 227 via a tunnel endpoint which encapsulates the packet 229 with a header for communication over the tunnel 227 (e.g., with a GENEVE header for communication over a GENEVE tunnel). The packet 229 travels over the tunnel 227 to a tunnel endpoint which maps to the interface 217 of the firewall 201 and decapsulates the packet 229. Prior to decapsulation, the packet 229 can be classified as corresponding to the sub-interface 217A based on metadata of the packet 229 header. Based on the firewall 201 receiving the packet 229, multi-deployment mode configuration service ("service") 203 performs a lookup of a session identifier for a session with which the packet 229 is associated in session mode information 223. As described above, the session mode information 223 indicates identifiers of active sessions and their associated mode of firewall 201 deployment. If the session identifier associated with the packet 229 can be identified in the session mode information 223, the service 203 can determine the mode of deployment of the firewall 201 for that session without performing an additional route lookup on the destination address of the inner header of the packet 229 in routing table 225.

Based on performing a lookup of the session identifier of the session associated with the packet 229, depicted as a session identifier of 217 in this example, the service 203 determines that the mode of deployment of the firewall 201 for the session has already been determined. The service 203 had previously stored the mode of firewall 201 deployment for the session in the session mode information 223 as being bump-in-the-wire during session setup as described in reference to FIG. 1. Because the session mode information 223 indicates that the session associated with the packet 229 is a bump-in-the-wire session, the service 203 will send the packet 229 out on the interface by which it entered the firewall 201 (i.e., the logical division of the interface 217 corresponding to the sub-interface 217A) without performing NAT for the packet 229 if the packet 229 is allowed by the appropriate one of the zone-based security policies 241. Thus, the service 203 determines mode of firewall deployment for a session based on performing a route lookup on a destination address included in an inner header of a packet occurs once during session setup. Upon detection of subsequent packets communicated during the session, the service 203 determines the mode of firewall deployment which was previously determined for the session based on performing a lookup of the session identifier in the session mode information 223 and handles the subsequent packets accordingly without further route lookups.

Because the packet 229 is travelling within the trusted zone, the firewall 201 applies the security policies corresponding to this source/destination zone pairing, or the intra-zone policies 241A, for inspection of the packet 229. After determining that the packet 229 is allowed by the intra-zone policies 241A, the firewall 201 sends the packet out on the sub-interface 217A, and the corresponding tunnel endpoint re-encapsulates the packet 229. The packet 229 travels over the tunnel 227 to the tunnel endpoint of the load balancer 215 for decapsulation and communication to its destination within the trusted zone.

Figure 3:
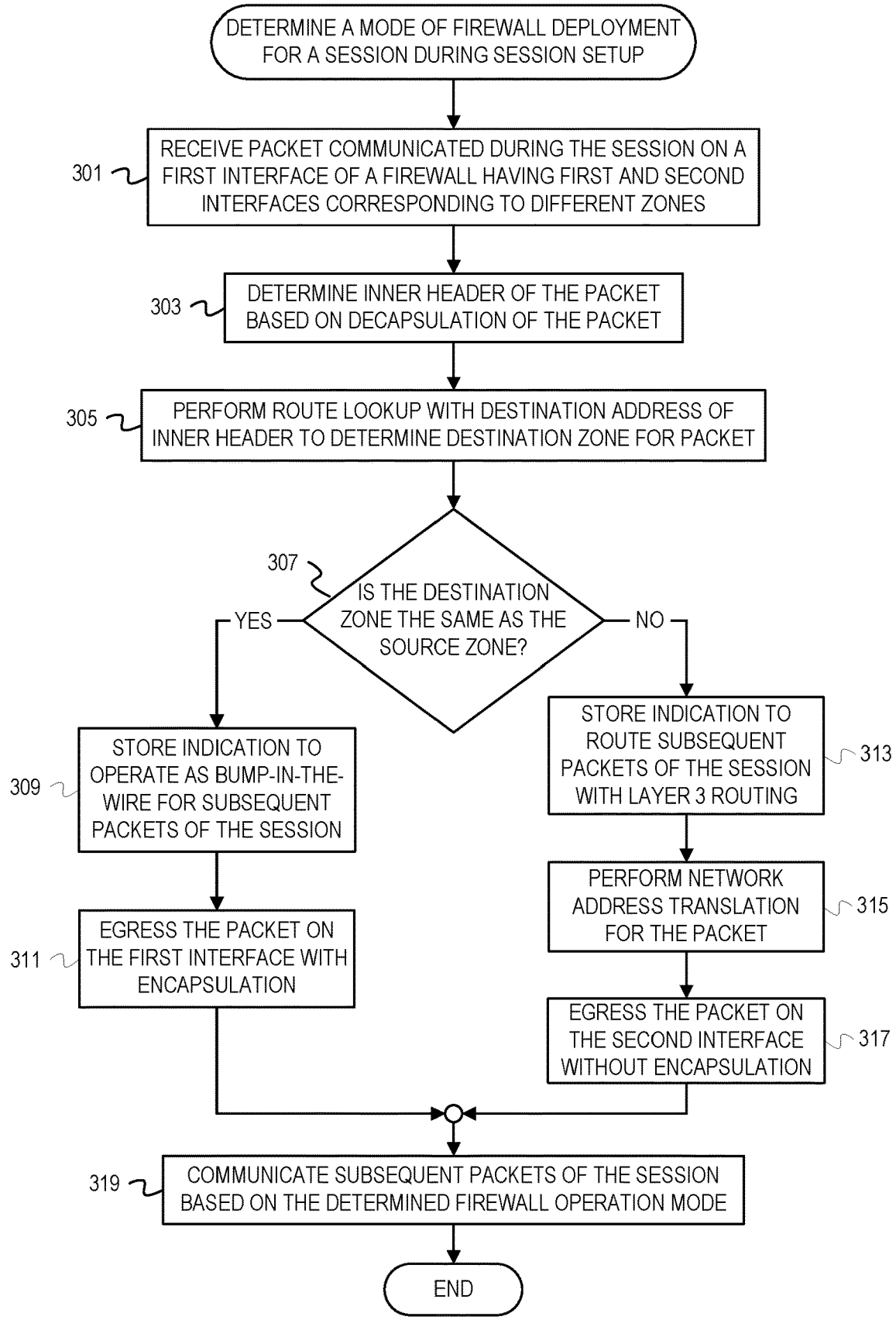
FIG. 3 is a flowchart of example operations for determining a mode of firewall deployment for a session during session setup.
Figure 4:
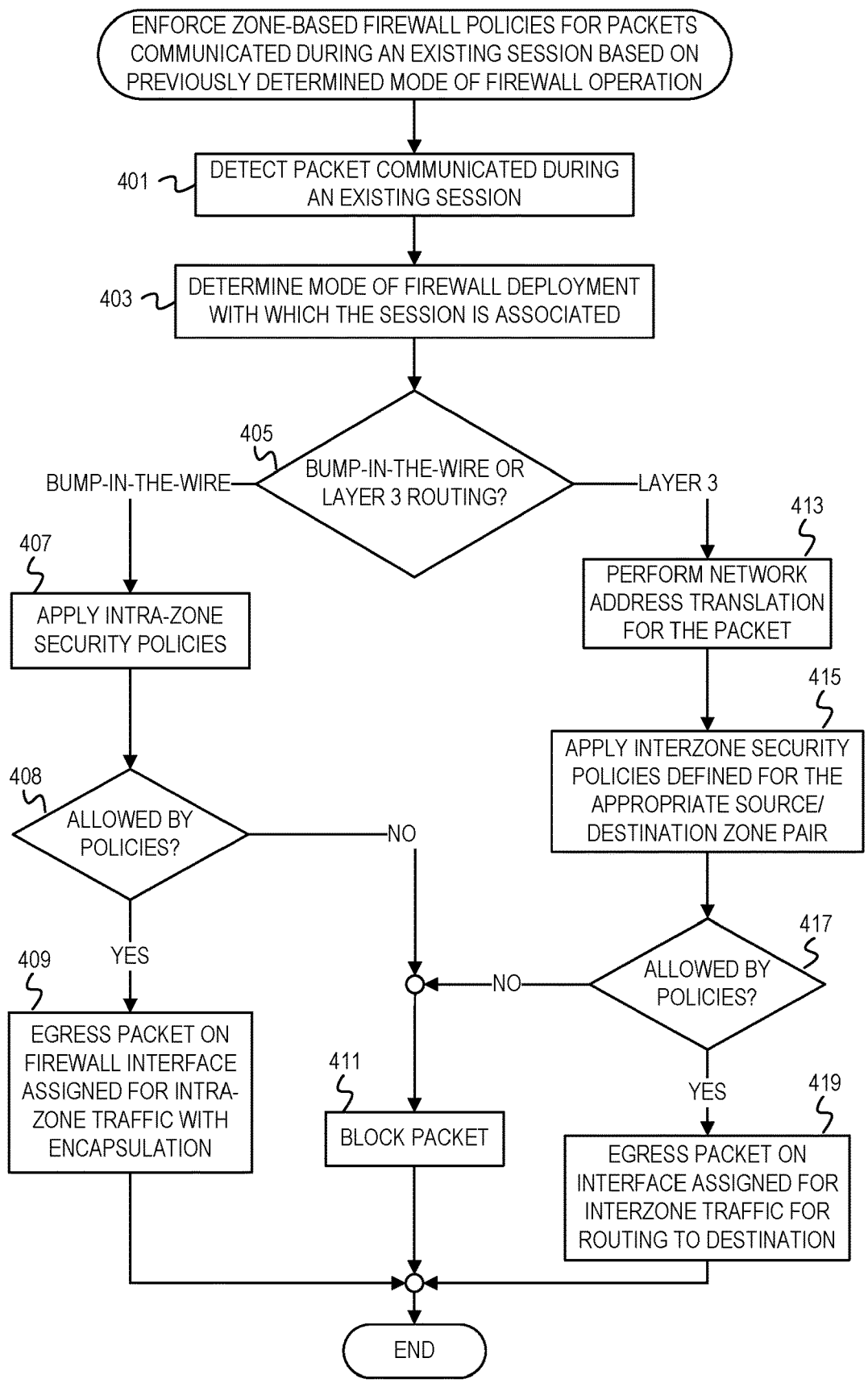
FIG. 4 depicts a flowchart of example operations for enforcing zone-based firewall policies for packets communicated during an existing session based on the mode of firewall operation which was previously determined.
Figure 5:
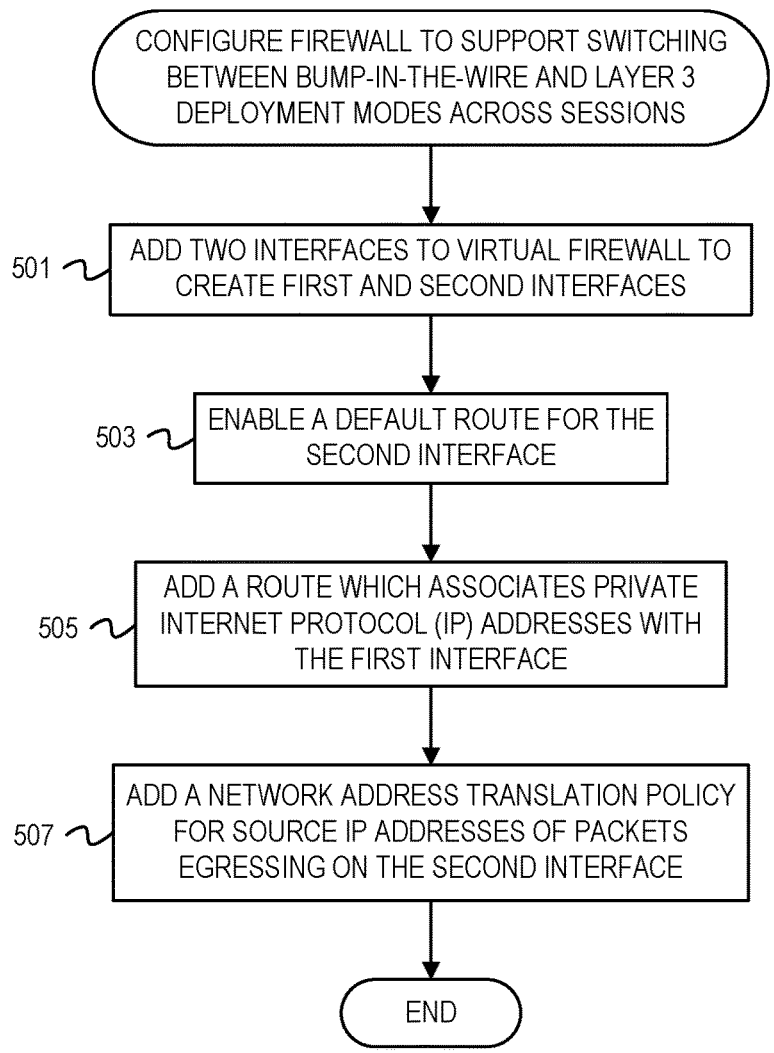
FIG. 5 is a flowchart of example operations for configuring a firewall to support switching between bump-in-the-wire and Layer 3 modes of firewall deployment across sessions.

FIGS. 3-5 are flowcharts of example operations for supporting zone-based policy enforcement for a firewall connected to a one-arm load balancer. The example operations are described with reference to a multi-deployment mode configuration service (hereinafter "the service") for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for determining a mode of firewall deployment for a session during session setup. As described above, a mode of firewall deployment for a session refers to the deployment configuration a virtual firewall (hereinafter simply "firewall") having two interfaces will operate according to during the session, where the interfaces support different modes of deployment (i.e., bump-in-the-wire and Layer 3 routing). The interface configured as a bump-in-the-wire interface, which may comprise sub-interfaces, is assigned to a first zone, such as a trusted or internal zone. The interface configured as a Layer 3 interface is assigned to a second zone, such as an untrusted zone. The example operations assume that the received packet is the first packet of the session.

At block 301, the service receives a packet communicated during a session on the first interface of the firewall. The packet has been sent from a one-arm load balancer which load balances traffic across a fleet of virtual firewalls. Packets sent between the one-arm load balancer and the firewall are encapsulated through tunneling (e.g., with GENEVE), where the load balancer and the firewall comprise tunnel endpoints for decapsulation and encapsulation of packets. The packet is thus decapsulated upon receipt at a tunnel endpoint which maps to the first interface, which removes an outer header with which the original packet was encapsulated. As an example, decapsulation of an IPv4 packet by an endpoint of a GENEVE tunnel removes a GENEVE header from the packet.

At block 303, the service determines an inner header of the packet based on the decapsulation of the packet. Decapsulation of the packet exposes an inner header of the packet. For example, the inner header may be an IP header of the IPv4 packet from which the outer GENEVE header was removed. The inner header comprises a source IP address and a destination IP address of the packet.

At block 305, the service performs a route lookup with the destination address of the inner header to determine the destination zone for the packet. The result of the route lookup will indicate the destination zone for the packet, which may be in terms of the interface on which the packet is to exit the firewall based on the destination address. As described above, the firewall was configured with two interfaces which are assigned to different zones. Interface assignments to security zones may be indicated in the configuration of the firewall so that the interface indicated in the result of the route lookup can be mapped to the corresponding security zone. Thus, the interface on which the packet exits the firewall corresponds to the destination zone for the packet. If the packet is traveling to a destination within the same zone, or the same zone to which the first interface was assigned, the packet is traveling within the same zone. If the packet is traveling to a destination within the other zone, or the zone to which the second interface was assigned, the packet is traveling between zones.

In some implementations, logical sub-interfaces may have been defined on the first interface such that the sub-interfaces are mapped back to the first interface. Thus, if a result of the route lookup indicates the first interface, the service will determine that the packet is traveling to a destination within the same zone and will exit on the same interface from which it entered irrespective of the particular one of the logical sub-interfaces by which it was classified on ingress. As an example, sub-interfaces eth1/1.1 and eth1/1.2 may be defined on an interface eth1/1. If the packet was classified as corresponding to either eth1/1.1 or eth1/1.2 based on metadata of the encapsulated packet and a result of the route lookup indicates eth1/1, the service will determine that the packet is traveling within the zone to which eth1/1 has been assigned regardless of which of the sub-interfaces was determined for ingress of the packet.

At block 307, the service determines if the destination zone is the same as the source zone. The service determines whether the packet is traveling within the same zone or between different zones based on the result of the route lookup. If the destination zone is the same as the source zone, operations continue at block 309. If the destination zone is different than the source zone, operations continue at block 313.

At block 309, the service stores an indication for the firewall to operate as a bump-in-the-wire for subsequent packets of the session. The service maintains session identifiers for active sessions and their associated mode of firewall deployment (i.e., bump-in-the-wire or Layer 3 routing) as part of a state table maintained for the firewall indicating active sessions or as an additional state table of the firewall. The service adds the identifier of the session to the maintained session identifiers and associates an indication of bump-in-the-wire mode of deployment with the session identifier. The service may indicate the mode of deployment with an identifier, label, or other indicator of deployment mode which the service can use to distinguish between Layer 3 routing and bump-in-the-wire modes of deployment during subsequent lookups for the deployment mode for the session.

At block 311, assuming the packet is allowed by intrazone policies attached to the firewall, the service egresses the packet on the first interface. Egressing the packet on the first interface results in re-encapsulation of the packet by the tunnel endpoint which maps to the first interface. In accordance with the bump-in-the-wire mode of deployment, the service returns packets which the firewall allows to pass to the one-arm load balancer over the tunnel.

At block 313, the service stores an indication for the firewall to route subsequent packets of the session with Layer 3 routing. As described above at block 309, the service maintains session identifiers for active sessions and their associated mode of firewall deployment. The service adds the identifier of the session to the maintained session identifiers and associates an indication of Layer 3 mode of deployment with the session identifier.

At block 315, assuming the packet is allowed by interzone policies attached to the firewall, the service performs NAT for the packet. Distinguishing between bump-in-the-wire packets and Layer 3 packets allows the firewall to perform NAT for source IP addresses of select packets, or those which are traveling between different zones (e.g., from a trusted zone to an untrusted zone). At block 317, the service egresses the packet on the second interface without encapsulation to be routed to its destination.

At block 319, the service communicates subsequent packets of the session based on the determined firewall operation mode. The service thus supports switching between bump-in-the-wire and Layer 3 modes of deployment for the firewall across sessions based on the initial route lookup with the destination address of the inner header. Handling of subsequent packets of existing sessions is described in reference to FIG. 4.

FIG. 4 depicts a flowchart of example operations for enforcing zone-based firewall policies for packets communicated during an existing session based on the mode of firewall operation which was previously determined as described in reference to FIG. 3. At block 401, the service detects a packet communicated during an existing session. The firewall on which the service executes is stateful so that the packet can be matched to a session to which it corresponds. The packet may have been sent from a one-arm load balancer and entered the firewall on a first interface, where sub-interfaces may be defined on the first interface, or may have entered the firewall on a second interface via an Internet gateway.

At block 403, the service determines the mode of firewall deployment with which the session is associated. As described above, the service maintains indications of session identifiers and corresponding firewall deployment modes for active sessions so that the service can distinguish between Layer 3 routing sessions and bump-in-the-wire sessions and the firewall can handle the packets accordingly. The service performs a lookup of the identifier of the session in the indications of sessions and corresponding deployment modes to determine the mode of deployment which was previously determined based on the inner header-based route lookup for the first packet of the session.

At block 405, if the service determines the session is a bump-in-the-wire session, operations continue at block 407. Bump-in-the-wire sessions are those for which packets ingress and egress on the same interface of the firewall for communication within a security zone (e.g., within a trusted zone). If the service determines the session is a Layer 3 routing session, operations continue at block 413. Layer 3 routing sessions are those for which packets ingress and egress on different interfaces of the firewall for communication between security zones, such as from a trusted zone to an untrusted zone reachable over the Internet.

At block 407, the service applies intra-zone security policies to the packet. The intra-zone security policies attached to the firewall are those defined for traffic having the same source zone and destination zone, such as a packet traveling within the trusted zone. At block 408, the service determines if the packet is allowed by the security policies. If the packet is allowed, operations continue at block 409. If the packet is not allowed, operations continue at block 411, where the firewall blocks the packet from communication to its destination.

At block 409, the service egresses the packet on the firewall interface assigned for intra-zone traffic with encapsulation of the packet. In other words, the service egresses the packet on the same interface on which it entered the firewall. The service returns the packet to the one-arm load balancer for communication to its destination. On egress, the packet is encapsulated by the tunnel endpoint corresponding to the firewall interface for communication to the one-arm load balancer over a tunnel.

At block 413, the service performs NAT for the packet. The IP address of the packet which the service translates depends on the direction of flow of the packet. If the packet is an outbound packet, such as a packet traveling from a source IP address within a private network to a destination IP address accessible over the Internet (e.g., from a trusted zone to an untrusted zone), the service performs NAT of the source IP address of the packet. If the packet is an inbound packet, such as a packet traveling over the Internet to a destination within a private network (e.g., from an untrusted zone to a trusted zone), the service performs NAT of the destination IP address of the packet.

At block 415, the service applies interzone security policies defined for the source zone and destination zone pair which corresponds to the packet. Multizone security policies attached to the firewall can include different sets of security policies to be applied to packets depending on the source zone and destination zone of the packets. As an example, the multizone security policies can include first security policies defined for packets having a source zone of the trusted zone and a destination zone of the untrusted zone and second security policies defined for packets having a source zone of the untrusted zone and a destination zone of the trusted zone. The service applies the policies which correspond to the pairing of the source zone and destination zone which the firewall determined for the packet.

At block 417, the service determines if the packet is allowed by the security policies. If the packet is allowed, operations continue at block 419. If the packet is not allowed, operations continue at block 411, where the firewall blocks the packet from communication to its destination.

At block 419, the service egresses the packet on the interface assigned for interzone traffic for routing to its destination. Because the firewall is operating in Layer 3 routing mode of deployment for the session, the firewall determines the destination to which the packet should be routed based on a route lookup according to Layer 3 protocol and egresses the packet on the corresponding interface of the firewall indicated in the route lookup, with encapsulation or NAT performed for the packet based on the egress interface. If the packet was an inbound packet, the service egresses the packet on the interface by which packets are sent to the one-arm load balancer, and the corresponding tunnel endpoint which maps to the interface encapsulates the packet on egress for communication to the load balancer. If the packet was an outbound packet, the service egresses the packet on the interface by which packets can be sent over the Internet (e.g., via an Internet gateway) with NAT performed for the outbound packet.

FIG. 5 is a flowchart of example operations for configuring a firewall to support switching between bump-in-the-wire and Layer 3 modes of firewall deployment across sessions. In some implementations, configuration of virtual firewalls to support bump-in-the-wire and Layer 3 deployment modes can be automated (e.g., through execution of a script).

At block 501, the service adds two interfaces to a created virtual firewall ("firewall") to create first and second interfaces. The additional interfaces are firewall interfaces offered by the CSP on which logical interfaces of the firewall are defined. The service assigns the first and second interfaces respective first and second security zone, such as trusted and untrusted zones, respectively.

At block 503, the service enables a default route for the second interface. The default route facilitates routing of packets during sessions associated with Layer 3 mode of deployment for which the destination IP address of outbound packets can be any IP address. With the default route enabled, if a routing table lookup for a packet with the destination address does not produce a match, the packet is egressed on the second interface. The service can configure the second interface as a Dynamic Host Configuration Protocol (DHCP) client as part of enabling the default route for the second interface.

At block 505, the service adds a route which associates private IP addresses with the first interface. The service adds a route to be installed to the routing table which associates destination addresses corresponding to private IP addresses with the first interface as an egress interface such that packets destined for a private IP address exit the firewall on the first interface. Private IP addresses specified in the route are the ranges of IP addresses reserved for private networks (i.e., as specified in Request for Comment (RFC) 1918).

At block 507, the service adds a NAT rule for source IP addresses of packets egressing on the second interface. The service defines a NAT rule for source IP addresses which at least specifies the second interface as the egress interface. As a result, packets egressing on the second interface will match the NAT rule so that the firewall performs NAT on source IP addresses of the packets. Addition of the NAT rule also ensures that the return traffic will be communicated to the firewall.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 3 and FIG. 4 can be performed in parallel or concurrently across sessions. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
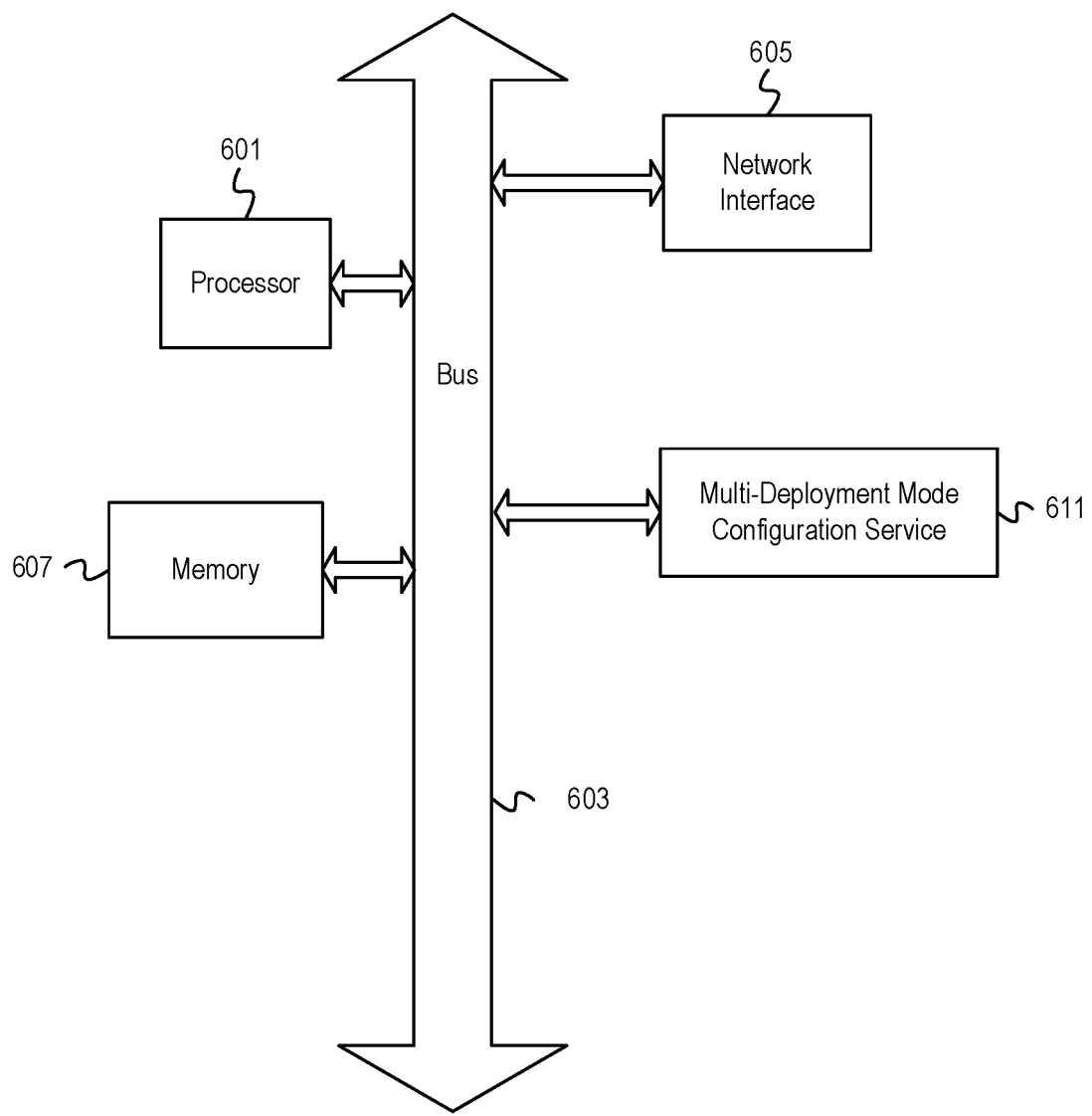
FIG. 6 depicts an example computer system with a multi-deployment mode configuration service.

FIG. 6 depicts an example computer system with a multi-deployment mode configuration service. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes multi-deployment mode configuration service 611. The multi-deployment mode configuration service 611 supports communication/routing of packets in either bump-in-the-wire or Layer 3 routing modes of deployment of a firewall connected to a one-arm load balancer based on ingress and egress firewall interfaces of the packets. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for supporting zone-based policy enforcement for a firewall connected to a one-arm load balancer as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/managed by the cloud service provider entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   detecting a packet communicated during a session on a first interface of a firewall comprising the first interface and a second interface,
   the first interface assigned to a first zone and the second interface assigned to a second zone different from the first zone;
   after decapsulation of an outer header from the packet, performing a route lookup for a destination address included in an inner header exposed from the decapsulation,
   determining an egress interface for the packet on which the packet is to exit the firewall based on a result of the route lookup;
   determining a mode of deployment of the firewall for the session based on determining if the egress interface is the first interface or the second interface; and
   sending the packet out on the egress interface for communication to the destination address.

2. The method of claim 1, wherein the mode of deployment comprises bump-in-the-wire or Layer 3 routing.

3. The method of claim 2 further comprising,
   based on determining that the egress interface is the first interface, determining that the mode of deployment for the session is bump-in-the-wire;
   sending the packet out on the first interface, wherein the packet is re-encapsulated; and
   associating an indication of bump-in-the-wire mode of deployment with an identifier of the session.

4. The method of claim 2 further comprising,
   based on determining that the egress interface is the second interface, determining that the mode of deployment for the session is Layer 3 routing;
   performing network address translation on a source address included in the inner header; and
   associating an indication of Layer 3 routing mode of deployment with an identifier of the session,
   wherein sending the packet out on the egress interface comprises sending the packet out on the second interface to be routed to the destination address.

5. The method of claim 1, wherein detecting the packet on the first interface comprises receiving the packet from a one-arm load balancer connected to the firewall.

6. The method of claim 1 further comprising configuring the firewall with the first interface and the second interface, wherein the first interface is configured as a bump-in-the-wire interface and the second interface is configured as a Layer 3 interface.

7. The method of claim 1 further comprising, based on detecting subsequent packets of the session, determining the mode of deployment of the firewall for the session based on an identifier of the session and sending the subsequent packet out on one of the first interface or the second interface which corresponds to the mode of deployment.

8. The method of claim 1 further comprising determining security policies to apply to the packet based on a source zone and destination zone of the packet,
   wherein communicating the packet to the destination address comprises communicating the packet to the destination address based on the packet being allowed by the security policies, and
   wherein each of the source zone and the destination zone correspond to the first zone or the second zone.

9. The method of claim 1, wherein a result of the route lookup for the destination address indicates the egress interface for the packet, and wherein determining the egress interface based on performing the route lookup comprises determining the egress interface based on the result of the route lookup.

10. One or more non-transitory machine-readable media comprising program code to:
    based on detection of a first packet communicated during a session on a first interface of a firewall, determine whether a mode of deployment of the firewall is indicated for the session based, at least in part, on an identifier of the session;
    based on a determination that the mode of deployment is not indicated for the session, determine a destination network address included in an inner header of the first packet, wherein the inner header was exposed after decapsulation of the first packet to remove an outer header;
    perform a route lookup for the destination network address, wherein a result of the route lookup indicates whether the first packet is to exit the firewall on the first interface or a second interface of the firewall;
    determine the mode of deployment of the firewall for the session based on the result of the route lookup; and
    based on a determination that the first packet is allowed by a first of zone-based security policies applied to the first packet, communicate the first packet to the destination network address according to the mode of deployment.

11. The non-transitory machine-readable media of claim 10, wherein the mode of deployment is bump-in-the-wire if the first packet is to exit on the first interface and Layer 3 routing if the first packet is to exit on the second interface.

12. The non-transitory machine-readable media of claim 11, wherein the program code to communicate the first packet comprises program code to egress the first packet on the first interface for communication to a one-arm load balancer over a first tunnel based on a determination that the mode of deployment is bump-in-the-wire, wherein the first packet is re-encapsulated for communication over the first tunnel.

13. The non-transitory machine-readable media of claim 11 further comprising program code to, based on a determination that the mode of deployment is Layer 3 routing, perform network address translation on a source network address included in the inner header of the first packet, wherein the program code to communicate the first packet comprises program code to route the first packet toward the destination network address based on egressing the first packet on the second interface.

14. The non-transitory machine-readable media of claim 10 further comprising program code to,
    associate an indication of the mode of deployment of the firewall with an identifier of the session based on the determination of the mode of deployment;
    based on detection of a second packet communicated during the session, determine whether the mode of deployment of the firewall is indicated for the session; and
    based on a determination that the mode of deployment of the firewall is indicated for the session, communicate the second packet to a destination of the second packet according to the mode of deployment.

15. The non-transitory machine-readable media of claim 10 further comprising program code to, based on a determination that the mode of deployment of the firewall is indicated for the session, communicate the first packet to the destination network address according to the mode of deployment indicated for the session.

16. An apparatus comprising:
    a processor; and
    a computer-readable medium having instructions stored thereon that are executable by the processor to cause the apparatus to,
        detect a packet communicated during a session on a first interface of a firewall comprising the first interface and a second interface assigned to respective first and second zones;
        after decapsulation of an outer header from the packet, perform a route lookup for a destination address designated in an inner header exposed from the decapsulation,
        determine an interface on which the packet is to exit the firewall based on a result of the route lookup;
        determine a mode of deployment of the firewall for the session based on a determination of whether the packet is to exit the firewall on the first interface or the second interface;
        associate an indication of the mode of deployment with an identifier of the session; and
        send the packet out on the interface on which the packet is to exit the firewall.

17. The apparatus of claim 16, wherein the mode of deployment of the firewall comprises bump-in-the-wire or Layer 3 routing.

18. The apparatus of claim 17, further comprising instructions executable by the processor to cause the apparatus to,
    based on a determination that the packet is to exit the firewall on the first interface, determine that the mode of deployment for the session is bump-in-the-wire; and
    send the packet out on the first interface for communication over a tunnel to a one-arm load balancer, wherein the packet is re-encapsulated for communication over the tunnel.

19. The apparatus of claim 17, further comprising instructions executable by the processor to cause the apparatus to,
    based on a determination that the packet is to exit the firewall on the second interface, determine that the mode of deployment for the session is Layer 3 routing; and
    perform network address translation on a source address designated in the inner header.

20. The apparatus of claim 16 further comprising instructions executable by the processor to cause the apparatus to, based on detecting a subsequent packet of the session, determine the mode of deployment of the firewall for the session based on the identifier of the session and send the subsequent packet out on one of the first interface or the second interface which corresponds to the mode of deployment.

* * * * *